United States Patent [19]

Lee

[11] 4,125,065

[45] Nov. 14, 1978

[54] COMBINED COOKING, DRAINING AND MASHING DEVICE

[76] Inventor: Connie M. Lee, Rte. #1, Box 145 A, Subiaco, Ark. 72865

[21] Appl. No.: 838,641

[22] Filed: Oct. 3, 1977

[51] Int. Cl.² ............................................. A47J 19/04
[52] U.S. Cl. ................................. 99/348; 366/289; 366/244; 366/255
[58] Field of Search ................. 99/348, 352; 100/238; 366/289, 332, 244, 245

[56] References Cited

U.S. PATENT DOCUMENTS

| | | | |
|---|---|---|---|
| 553,027 | 1/1896 | Eynon | 366/244 |
| 1,488,371 | 3/1924 | Allison | 366/289 |
| 2,651,343 | 9/1953 | Alexander | 366/289 |
| 2,719,703 | 10/1955 | Boakes | 366/244 |

FOREIGN PATENT DOCUMENTS 311,244  3/1919  Fed. Rep. of Germany ............. 99/348

*Primary Examiner*—Robert W. Jenkins
*Attorney, Agent, or Firm*—William S. Dorman

[57] ABSTRACT

A combined cooking, draining, and mashing apparatus for food including a pot having a cylindrical side, a flat bottom and an open top and capable of being heated in order to cook said food, a removable lid capable of fitting snuggly in the open top of the pot, and a section on the lid adapted to open having vents or holes for draining. A crank, exterior to the pot and lid, is connected to a mashing attachment inside the pot through a gear arrangement.

4 Claims, 2 Drawing Figures

COMBINED COOKING, DRAINING AND MASHING DEVICE

BACKGROUND OF THE INVENTION

1. Field of the Invention

This invention relates to a simply constructed cooking, draining and mashing device for foods such as peeled potatoes so as to combine the cooking, draining, and mashing operations in order to save time and increase efficiency in the preparation of food.

2. Description of the Prior Art

The usual kitchen preparation for foods, such as mashed potatoes, involves three separate steps. First, the potatoes are cooked in water, generally in a pot on a kitchen stove. When the cooking is completed, the water is drained from the pot or the potatoes themselves are removed from the pot. Finally, the potatoes are mashed, usually with a hand masher or an electric mixer. Once the potatoes have been cooked, it is desirable to perform the other operations quickly so that the potatoes are still warm when served.

Previous attempts to combine operations, such as Heiser, U.S. Pat. No. 1,430,012, have either involved a complicated construction, or have been impractical for use in the average household kitchen.

Therefore, it is a principal object and purpose of this invention to provide a combined device for cooking, draining and mashing foods such as potatoes that is of durable and inexpensive construction and is practical for household kitchen use.

It is also an object of this invention to provide a device that can accomplish the draining and mashing functions quickly and easily once cooking has been completed.

It is a further object of this invention to provide a combined device such that the food does not have to be handled from the time the cooking function has started until the time that the mashing is completed.

SUMMARY OF THE INVENTION

The present invention, designed as a combined cooker, drainer and masher for foods such as peeled potatoes, includes a pot which is provided with a small circular recess in the interior of the bottom of the pot. A lid has a lip which is made to fit snuggly into the top of the pot. A threaded vertical center rod is welded to the center of the interior of the lid. A crank handle, exterior to the pot and lid, is connected to a gear arrangement, interior to the pot and lid, which turns a pivot rod, parallel to the center rod, about the center rod. A removable circular holder, attached to the lower end if the center rod and the lower end of the pivot rod, snaps on and off and fits in the recess. The circular holder turns within the recess when the device is being used for mashing.

A removable mashing attachment includes spokes which extend outwardly from a center wheel having two openings to accommodate the threaded center rod and the pivot rod. Extending downward from the spokes are mashing teeth. The spokes are connected at their outer ends by a circular connecting ring which is located near the interior of the side of the pot.

A slidable section, provided in the lid, is moved open by means of a knob, and includes vents or holes for draining. While cooking, the progress of the food can be checked by opening the slidable section. When the food is done, the water may be poured off through the vents in the slidable section. To mash, the crank is turned, which causes the pivot rod to circle the center rod which turns the mashing attachment. As the mashing attachment turns, it also moves in a downward direction on the threaded center rod.

DETAILED DESCRIPTION OF THE PREFERRED EMBODIMENTS

Figure 1:
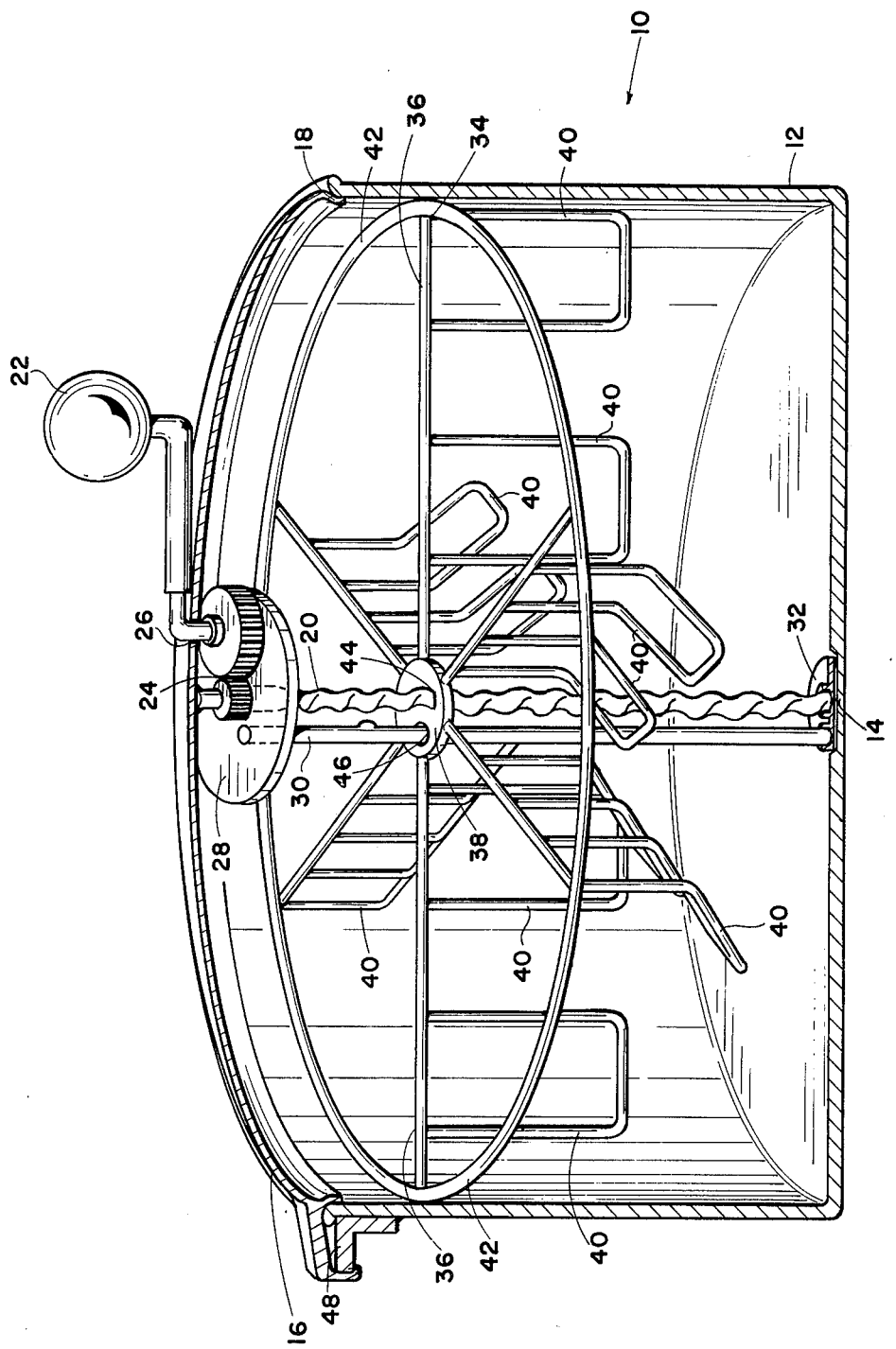
FIG. 1 is a perspective view of a combined cooking, draining and mashing device constructed in accordance with one embodiment of this invention and showing the pot and lid cut-away for clarity.

Referring to the drawings in detail, FIG. 1 shows a device 10 which can be utilized as a combined cooker, drainer and masher for foods such as peeled potatoes. The device includes a standard shaped pot 12 which is provided with a small recess 14 in the interior of the bottom of the pot. The pot has a cylindrical side, a flat bottom, and an open top. A lid 16 has a lip 18 surrounding the edge of the lid which is made to fit snuggly into the top of the pot 12 as best seen in the cut-away in FIG. 2. The pot and the lid would be made of a material that could be heated and used on a stove.

Welded to the center of the interior of the lid 16 is a threaded vertical center rod 20. The center rod is stationary even when the device is in use. A crank handle 22, exterior to the pot and lid, is connected to a gear arrangement 24, interior to the pot and lid, through an opening 26 provided in the lid. The gear arrangement 24 turns a circular disc 28 which pivots about the center rod 20 that acts as the vertical axis of the disc. Extending vertically from the bottom of the disc 28 towards the bottom of the pot, slightly off center, is a pivot rod 30. The center rod 20 is parallel to the pivot rod 30. Attached to the end of the bottom of the center rod 20 and the end of the bottom of the pivot rod 30 is a removable circular holder 32 which snaps on and snaps off and is capable of fitting in the recess 14. When the device is being used for mashing, the circular holder turns within the recess 14.

A mashing attachment 34 includes spokes 36 which extend divergently from a center wheel 38. Extending vertically downward from the spokes are mashing teeth 40. The teeth are angled at approximately a 45° angle near their ends as best seen in FIG. 1. The teeth 40 on each spoke 36 are staggered in relation to the teeth 40 on each adjacent spoke 36. The spokes 36 are connected at their outer ends by a circular connecting ring 42 which is located near the interior of the side of the pot 12. The center wheel 38 has two openings 44 and 46 which accommodate the threaded center rod and the pivot rod, respectively. Opening 46 has a circular shape while opening 44 has an oblong shape. The mashing attachment 34, including the center wheel 38, the spokes 36, the mashing teeth 40, and the connecting ring 42, is removable.

The pot 12 is provided with a pair of handles 48 and 50 and the lid is provided with a pair of handles 52 and 54 which is made to latch over the pot handles 48 and 50.

Figure 2:
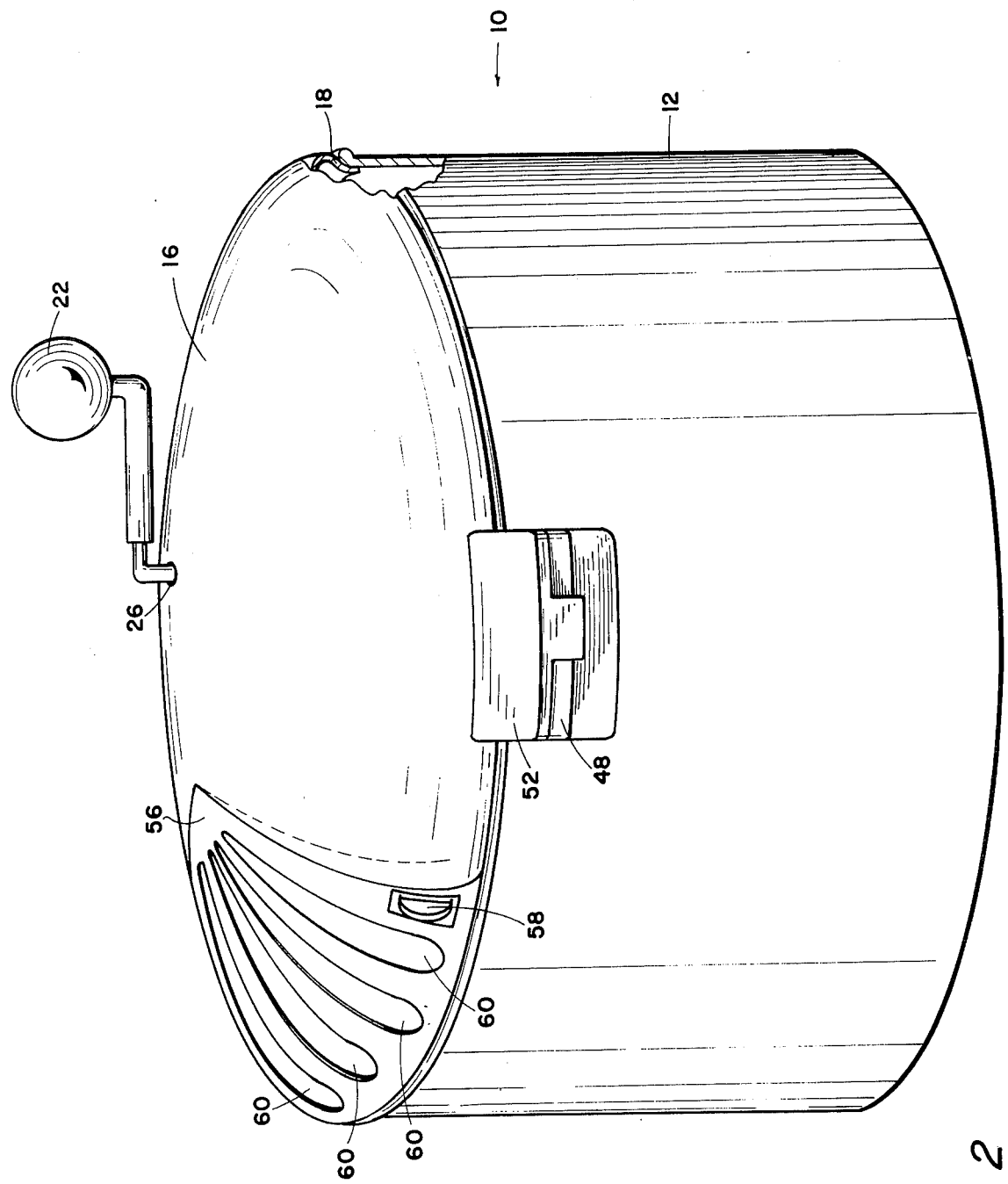
FIG. 2 is a perspective view of the device shown in FIG. 1 showing the slidable section in detail. A cut-away shows the fit of the lip of the lid into the pot.

As best seen in FIG. 2, the lid 16 is provided with a slidable section 56. The slidable section is moved open by means of a knob 58 and the cooking progress of food placed in the pot 12 can be checked. The slidable section, closed in FIG. 2, moves open in a nearly coplanar fashion with the rest of the lid. The slidable section contains vents or holes 60 for draining.

To prepare foods, such as peeled potatoes (not shown), the potatoes and water would be put in the pot and then the lid 16 and the accompanying mashing attachment 34 would be put in place. While the potatoes are cooking on the stove, their progress may be checked by opening the slidable section 56 and, for instance, poking them with a fork. When the potatoes are done, the water may be poured off through the vents 60. Without having to handle the potatoes, they can be mashed by turning the crank handle 22 which turns the mashing attachment 34. Turning the crank handle 22 in a clockwise direction causes the pivot rod 30 to circle the center rod in a counterclockwise direction, which turns the mashing attachment in a counterclockwise direction. As the attachment turns, it also moves in a downward direction on the threaded center rod. The circular and downward motion of the teeth mashes the potatoes or other food.

Turning the crank handle in a counterclockwise direction will cause the mashing attachment to turn and move upward.

Since the mashing attachment 34 is removable, other attachments, such as a stirring attachment or a whipping attachment (not shown), might be utilized for foods such as puddings, sauces, jams and creams.

The construction of the device 10 is such that it may be easily cleaned with soap and water.

Whereas, the present invention has been described in particular relation to the drawings attached hereto, it should be understood that other and further modifications of the invention, apart from those shown or suggested herein, may be made within the spirit and scope of this invention.

What is claimed is:

1. A combined cooking, draining and mashing apparatus for food which comprises a pot having cylindrical sides, a flat bottom and an open top and capable of being heated in order to cook food therein; a removable lid capable of fitting snugly on said open top of said pot; drain means provided on said lid; rotatable crank means rotated exterior to said lid; rotatable mashing means within said pot for mashing said food, and gear means to connect said crank means to said mashing means; wherein said mashing means includes a threaded center rod having an upper end connected to the center of the interior of said lid and extending vertically downwardly therefrom and terminating in a lower end, a pivot rod having an upper end connected to said gear means and extending downwardly therefrom parallel to said center rod and terminating in a lower end, whereby said pivot rod is turned about said center rod by said crank means, a removable center wheel having a first circular opening for receiving said pivot rod and a second oblong opening for receiving said center rod, whereby said center wheel is adapted to turn and move downwardly and upwardly, a plurality of spokes extending outwardly from said center wheel parallel to the bottom of said pot and terminating at ends adjacent the side of said pot, a connecting ring linking said ends of said spokes and mashing teeth extending downwardly from said spokes.

2. A combined cooking, draining and mashing apparatus as set forth in claim 1 wherein said mashing teeth on each spoke are staggered in relation to said mashing teeth on adjacent spokes.

3. A combined cooking, draining and mashing apparatus as set forth in claim 1 including a circular recess provided in the interior of said bottom of said pot, and a circular holder for retaining the lower end of said center rod therein and the lower end of said pivot rod therein and adapted to fit in said circular recess.

4. A combined cooking, draining and mashing apparatus as set forth in claim 1 wherein said drain means includes a slide section having drain vents and a handle formed on the outside of said slide section, whereby said section is adapted to slide open and shut along said lid.

* * * * *